(12) United States Patent
Zouza et al.

(10) Patent No.: US 11,196,364 B2
(45) Date of Patent: Dec. 7, 2021

(54) MOTOR CONTROL DEVICE

(71) Applicant: JTEKT CORPORATION, Osaka (JP)

(72) Inventors: Shouta Zouza, Toyota (JP); Yuuki Nakashima, Okazaki (JP); Yuji Fujita, Okazaki (JP); Toshihiro Takahashi, Nishio (JP); Xavier Palandre, Grézieu-la-Varenne (FR)

(73) Assignee: JTEKT CORPORATION, Osaka (JP)

( * ) Notice: Subject to any disclaimer, the term of this patent is extended or adjusted under 35 U.S.C. 154(b) by 66 days.

(21) Appl. No.: 15/930,769

(22) Filed: May 13, 2020

(65) Prior Publication Data

US 2020/0361524 A1 Nov. 19, 2020

(30) Foreign Application Priority Data

May 15, 2019 (JP) .............................. JP2019-092350

(51) Int. Cl.
*H02P 6/16* (2016.01)
*B62D 3/12* (2006.01)
*B62D 5/04* (2006.01)
*B62D 15/02* (2006.01)

(52) U.S. Cl.
CPC .................. *H02P 6/16* (2013.01); *B62D 3/12* (2013.01); *B62D 5/0463* (2013.01); *B62D 15/0235* (2013.01)

(58) Field of Classification Search
CPC ........... H02P 6/16; B62D 3/12; B62D 5/0463; B62D 15/0235
See application file for complete search history.

(56) References Cited

U.S. PATENT DOCUMENTS

| 2008/0023255 | A1  | 1/2008  | Colosky |
|---|---|---|---|
| 2013/0049652 | A1* | 2/2013  | Namikawa ................ H02P 6/00 318/400.02 |
| 2014/0311817 | A1  | 10/2014 | Kita et al. |
| 2020/0255067 | A1* | 8/2020  | Tanaka ................ B62D 15/0235 |
| 2020/0403543 | A1* | 12/2020 | Imamura .............. B62D 5/0409 |

FOREIGN PATENT DOCUMENTS

JP 2007-057236 A 3/2007

OTHER PUBLICATIONS

Nov. 12, 2020 Extended Search Report issued in European Patent Application No. 20174173.3.

* cited by examiner

*Primary Examiner* — Zoheb S Imtiaz
(74) *Attorney, Agent, or Firm* — Oliff PLC

(57) ABSTRACT

A motor control device is configured to control a motor as a dynamic force source depending on a position of a rotation detection object that rotates while interlocking with the motor, the motor and the rotation detection object being included in a mechanical apparatus including a plurality of constituent elements that interlock with each other. The motor control device includes a computation circuit configured to compute an absolute rotation angle of the rotation detection object, using a relative rotation angle of a first constituent element of the mechanical apparatus that is detected through a relative angle sensor provided in the mechanical apparatus, and a rotation number conversion value resulting from converting an absolute rotation angle of a second constituent element of the mechanical apparatus that is detected through an absolute angle sensor provided in the mechanical apparatus, into a rotation number of the first constituent element.

6 Claims, 7 Drawing Sheets

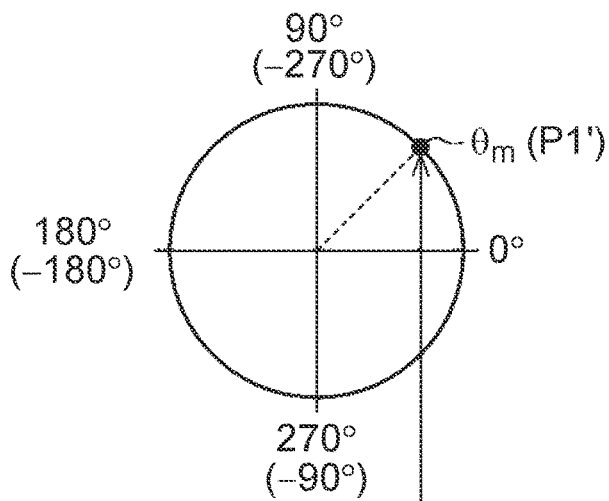
FIG. 5A
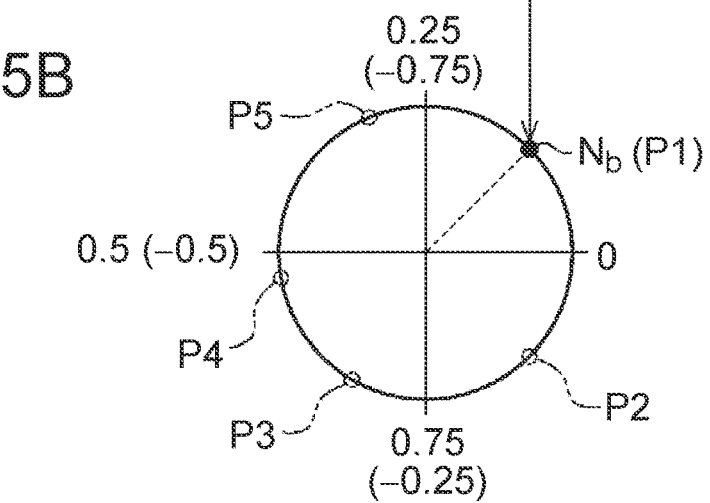
FIG. 5B
FIG. 6A
FIG. 6B
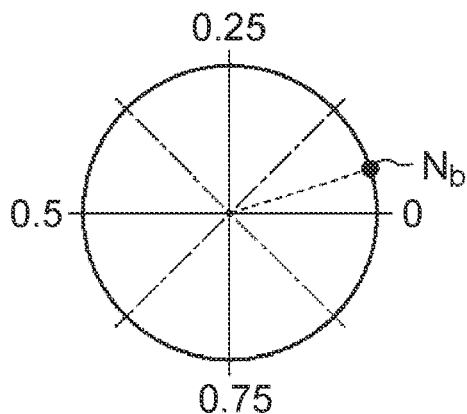
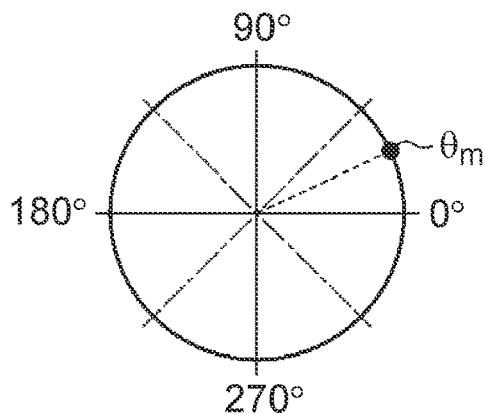

$270° \leq \theta_m < 315°$

MOTOR CONTROL DEVICE

CROSS-REFERENCE TO RELATED APPLICATION

This application claims priority to Japanese Patent Application No. 2019-092350 filed on May 15, 2019, incorporated herein by reference in its entirety.

BACKGROUND

1. Technical Field

The disclosure relates to a motor control device.

2. Description of Related Art

Conventionally, there has been known an electric power steering apparatus (referred to as an "EPS", hereinafter) that assists steering by adding a torque of a motor to a steering mechanism of a vehicle. A control device for the EPS controls electric current that is supplied to the motor, depending on a steering torque that is detected through a torque sensor. Further, the control device executes a compensation control such as a steering-back control to return a steering wheel to a neutral position, based on a steering angle that is a rotation angle of the steering shaft that is detected through an absolute angle sensor.

As a sensor that detects the absolute angle of a rotation shaft such as the steering shaft, there is a sensor described below. For example, a sensor in Japanese Patent Application Publication No. 2007-57236 (JP 2007-57236 A) transforms the rotation of the rotation shaft into the rotation of a reduction member through a speed reducer, and detects the transformed rotation of the reduction member through a detection unit. The detection unit generates an electric signal corresponding to the rotation of the reduction member. In the case where the reduction ratio of the speed reducer is "1/L", one rotation of the reduction member corresponds to L rotations of the rotation shaft. Therefore, it is possible to detect the absolute angle of the rotation shaft within L rotations, based on the electric signal generated by the detection unit.

SUMMARY

In a type of sensor that transforms the rotation of the rotation shaft into the rotation of a different member and that evaluates the absolute angle of the rotation shaft based on the rotation of the different member, including the sensor in JP 2007-57236 A, it is necessary to provide a transformation mechanism that transforms the rotation of the rotation shaft into the rotation of the different member, including the speed reducer. Therefore, there is a fear that the detection accuracy of the absolute angle of the rotation shaft decreases due to dimension tolerances or erection tolerances of constituent members in the transformation mechanism.

The disclosure provides a motor control device that can secure the detection accuracy of the absolute rotation angle of a rotation detection object.

A motor control device according to a first aspect of the disclosure controls a motor depending on a position of a rotation detection object, the motor being a dynamic force source, the rotation detection object rotating while interlocking with the motor, the motor and the rotation detection object being included in a mechanical apparatus, the mechanical apparatus including a plurality of constituent elements that interlock with each other. The motor control device includes a computation circuit configured to compute an absolute rotation angle of the rotation detection object, using a relative rotation angle of a first constituent element of the mechanical apparatus and a rotation number conversion value, the relative rotation angle of the first constituent element being detected through a relative angle sensor that is provided in the mechanical apparatus, the rotation number conversion value being a value resulting from converting an absolute rotation angle of a second constituent element of the mechanical apparatus into a rotation number of the first constituent element, the absolute rotation angle of the second constituent element being detected through an absolute angle sensor that is provided in the mechanical apparatus. The computation circuit includes a correction processing unit configured to correct the rotation number conversion value, based on comparison between the relative rotation angle of the first constituent element and a rotation angle conversion value, on a premise that a difference between the relative rotation angle of the first constituent element and the rotation angle conversion value is within a rotation angle equivalent to half rotation of the first constituent element and that the relative rotation angle of the first constituent element is correct, the rotation angle conversion value being a value resulting from converting a rotation angle correspondence value into the relative rotation angle of the first constituent element, the rotation angle correspondence value corresponding to the relative rotation angle of the first constituent element that is obtained when the rotation number conversion value is evaluated.

With the configuration, it is possible to obtain the rotation number conversion value corresponding to the rotation number of the first constituent element, based on the absolute rotation angle of the second constituent element that is detected through the absolute angle sensor. When an electric power source of the mechanical apparatus is switched from an off-state to an on-state, the absolute angle sensor can immediately detect the absolute rotation angle of the second constituent element. Therefore, when the electric power source of the mechanical apparatus is switched from the off-state to the on-state, it is possible to immediately compute the rotation number conversion value corresponding to the rotation number of the first constituent element on the basis of a reference position of the first constituent element that corresponds to a reference position of the second constituent element when the absolute rotation angle of the second constituent element is detected. Accordingly, it is not necessary to monitor the rotation number of the first constituent element, in a period during which the electric power source of the mechanical apparatus is in the off-state. Therefore, it is possible to restrain electric power consumption in the period during which the electric power source of the mechanical apparatus is in the off-state. Further, when the electric power source of the mechanical apparatus is switched from the off-state to the on-state, since it is possible to immediately obtain the rotation number conversion value corresponding to the rotation number of the first constituent element on the basis of the reference position of the first constituent element, it is possible to immediately obtain the absolute rotation angle of the rotation detection object, based on the rotation number conversion value corresponding to the rotation number of the first constituent element and the rotation angle of the first constituent element that is detected through the relative angle sensor.

However, there is a concern that the rotation number conversion value corresponding to the rotation number of the first constituent element becomes a value different from the actual rotation number of the first constituent element, due to dimension tolerances or erection tolerances of constituent members in the mechanical apparatus. In this case, there is a fear that the detection accuracy of the absolute rotation angle of the rotation detection object decreases due to use of the rotation number conversion value different from the actual rotation number.

In this respect, in the above configuration, the rotation number conversion value corresponding to the rotation number of the first constituent element is corrected based on the comparison between the relative rotation angle of the first constituent element and the rotation number conversion value resulting from converting the rotation angle correspondence value into the relative rotation angle of the first constituent element. Thereby, it is possible to obtain a correct rotation number conversion value corresponding to the actual rotation number of the first constituent element. Then, by using the correct rotation number conversion value, it is possible to obtain a correct absolute rotation angle of the rotation detection object. Accordingly, it is possible to secure the detection accuracy of the absolute rotation angle of the rotation detection object. The correction by the correction processing unit is performed on the premise that the difference between the relative rotation angle of the first constituent element and the rotation angle conversion value resulting from converting the rotation angle correspondence value into the relative rotation angle of the first constituent element is within the rotation angle equivalent to half rotation of the first constituent element and that the relative rotation angle of the first constituent element is correct.

Here, for example, a case where the rotation angle of the first constituent element that is detected through the relative angle sensor is an angle at an n–1-th rotation of the first constituent element and where the rotation angle conversion value resulting from converting the rotation angle correspondence value into the relative rotation angle of the first constituent element is an angle at an n-th rotation of the first constituent element will be discussed.

In this case, it can be unknown whether the rotation angle conversion value resulting from converting the rotation angle correspondence value into the relative rotation angle of the first constituent element is the value at the n–1-th rotation of the first constituent element or the value at the n-th rotation of the first constituent element, from the position of the rotation angle of the first constituent element that is detected through the relative angle sensor. However, in the above configuration, there is the premise that the difference between the rotation angle of the first constituent element that is detected through the relative angle sensor and the rotation angle conversion value resulting from converting the rotation angle correspondence value into the relative rotation angle of the first constituent element falls within the rotation angle equivalent to half rotation. Therefore, it is possible to identify whether the rotation angle conversion value resulting from converting the rotation angle correspondence value into the relative rotation angle of the first constituent element is the value at the n–1-th rotation of the first constituent element or the value at the n-th rotation of the first constituent element.

Here, as an example, a situation described below is assumed. That is, the angle at the n–1-th rotation of the first constituent element is an angle outside the range of half rotation of the first constituent element on the basis of the rotation angle of the first constituent element that is detected through the relative angle sensor. On the other hand, the angle at the n-th rotation of the first constituent element is an angle inside the range of half rotation of the first constituent element on the basis of the rotation angle of the first constituent element that is detected through the relative angle sensor. Therefore, it is found that the rotation angle conversion value resulting from converting the rotation angle correspondence value into the relative rotation angle of the first constituent element is not the angle at the n–1-th rotation of the first constituent element but the angle at the n-th rotation of the first constituent element. Further, in the above configuration, there is the premise that the rotation angle of the first constituent element that is detected through the relative angle sensor is correct, and therefore it is possible to obtain the correct rotation number conversion value, by subtracting one from the rotation number conversion value corresponding to the actually computed rotation number of the first constituent element.

In the above aspect, the computation circuit may include a first conversion unit and a second conversion unit. The first conversion unit may be configured to compute a first rotation angle conversion value resulting from converting the absolute rotation angle of the second constituent element into the relative rotation angle of the first constituent element based on a reduction ratio between the first constituent element and the second constituent element. The second conversion unit may be configured to compute the rotation number conversion value by dividing the first rotation angle conversion value by 360°, 360° being a rotation angle equivalent to one rotation of the first constituent element. The correction processing unit may include a first processing unit, a second processing unit and a third processing unit. The first processing unit may be configured to separate the rotation number conversion value into an integer part and a decimal part as the rotation angle correspondence value, the integer part corresponding to the rotation number of the first constituent element, the decimal part corresponding to the relative rotation angle of the first constituent element. The second processing unit may be configured to compute a correction value for the integer part, based on comparison between the relative rotation angle of the first constituent element and a second rotation angle conversion value, in view of the premise, the second rotation angle conversion value being a value resulting from transforming the decimal part into the relative rotation angle of the first constituent element. The third processing unit may be configured to compute a final rotation number of the first constituent element by adding the value of the integer part and the correction value, the final rotation number of the first constituent element being used for the computation of the absolute rotation angle of the rotation detection object.

In the above aspect, the computation circuit may include a rotation number computation unit, a subtractor and an absolute angle computation unit. The rotation number computation unit may be configured to compute the rotation number of the first constituent element based on the relative rotation angle of the first constituent element that is detected through the relative angle sensor. The subtractor may be configured to compute a correction value for the rotation number of the first constituent element that is computed by the rotation number computation unit, by subtracting the rotation number of the first constituent element that is computed by the rotation number computation unit, from a final rotation number that is computed by the correction processing unit. The absolute angle computation unit may be configured to compute the absolute rotation angle of the rotation detection object, based on the relative rotation angle of the first constituent element that is detected through the relative angle sensor and a final rotation number of the first constituent element after the correction value is reflected in the rotation number of the first constituent element that is computed by the rotation number computation unit.

In the above aspect, the first constituent element may be an assist motor configured to generate a steering assistance force, the steering assistance force being a torque that is given to a steering mechanism of a vehicle and that is in the same direction as a steering direction, the second constituent element may be a pinion shaft that engages with a turning shaft, the turning shaft being a shaft by which a turning wheel of the vehicle is turned, and the rotation detection object may be a steering shaft that is coupled to the turning shaft through the pinion shaft.

In the above aspect, the first constituent element may be a reaction motor configured to generate a steering reaction force, the steering reaction force being a torque that is given to a steering shaft and that is in an opposite direction of a steering direction, dynamic force transmission between the steering shaft and a turning shaft being separated, the turning shaft being a shaft by which a turning wheel of a vehicle is turned, the second constituent element may be a pinion shaft that engages with the turning shaft, and the rotation detection object may be the steering shaft.

In the above aspect, the first constituent element may be a turning motor configured to generate a turning force that is given to a turning shaft and by which a turning wheel of a vehicle is turned, the turning shaft being a shaft by which the turning wheel of the vehicle is turned, the second constituent element may be a first pinion shaft that engages with the turning shaft, and the rotation detection object may be a second pinion shaft that engages with the turning shaft.

With the motor control device in the disclosure, it is possible to secure the detection accuracy of the absolute rotation angle of the rotation detection object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a unit circle showing the rotation angle of a motor that is detected through a relative angle sensor;

FIG. 5B is a unit circle showing a decimal part of a rotation number conversion value of the motor that is computed based on the rotation angle of a pinion shaft that is detected through an absolute angle sensor;

FIG. 6A is a unit circle showing the decimal part of the rotation number conversion value of the motor that is computed based on the rotation angle of the pinion shaft that is detected through the absolute angle sensor;

FIG. 6B is a unit circle showing the rotation angle of the motor that is detected through the relative angle sensor;

DETAILED DESCRIPTION OF EMBODIMENTS

First Embodiment

Figure 1:
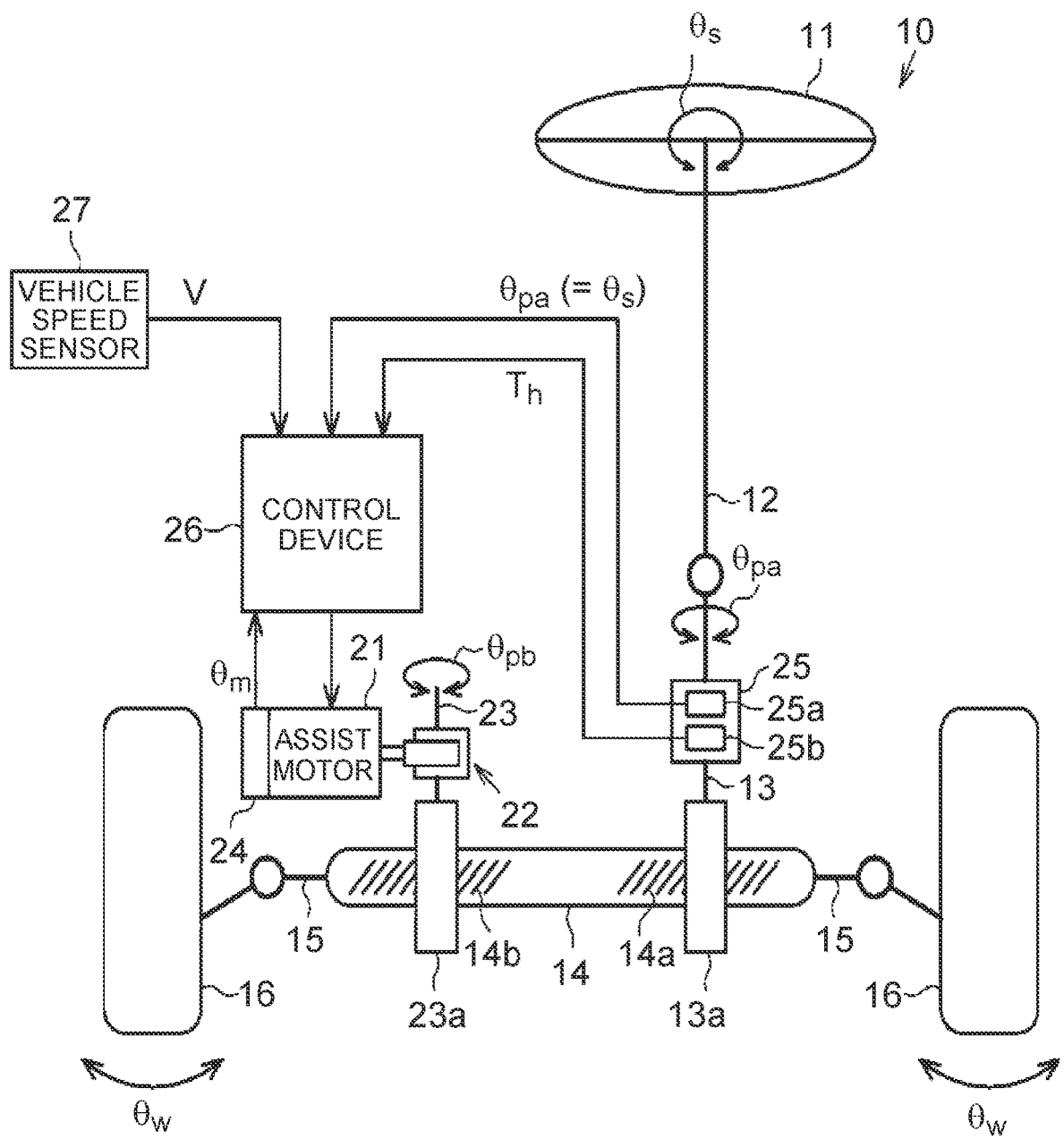
FIG. 1 is a configuration diagram of a steering apparatus that is equipped with a motor control device of a first embodiment.

A first embodiment in which a motor control device is applied to a steering apparatus of a vehicle will be described below. As shown in FIG. 1, a steering apparatus 10 of a vehicle includes a steering shaft 12 coupled to a steering wheel 11. A pinion shaft 13 is provided at an end portion of the steering shaft 12 on the opposite side of the steering wheel 11. A pinion gear 13a of the pinion shaft 13 engages with a rack gear 14a of a turning shaft 14 that extends in a direction of crossing the pinion shaft 13. Right and left turning wheels 16 are coupled to both ends of the turning shaft 14 through tie rods 15, respectively. The steering shaft 12, the pinion shaft 13 and the turning shaft 14 constitute a steering mechanism of the vehicle.

The steering apparatus 10 includes an assist motor 21, a speed reducer 22, a pinion shaft 23, a relative angle sensor 24, a torque angle sensor (referred to as a "TAS 25", hereinafter), and a control device 26, as a configuration for generating a steering assistance force (assist force).

The assist motor 21 is a generation source of the steering assistance force, and, for example, a brushless motor having three phases is employed. The assist motor 21 is coupled to the pinion shaft 23 through the speed reducer 22. A pinion gear 23a of the pinion shaft 23 engages with a rack gear 14b of the turning shaft 14. Rotation of the assist motor 21 is reduced by the speed reducer 22, and the reduced rotation force, as the steering assistance force, is transmitted from the pinion shaft 23 through the turning shaft 14 to the pinion shaft 13.

The relative angle sensor 24 is provided on the assist motor 21. The relative angle sensor 24 detects a rotation angle $\theta_m$ of the assist motor 21, as a relative angle in a range from 0° to 360°. As the relative angle sensor 24, for example, various types of sensors including a magnetic sensor such as a Hall sensor or a magnetoresistance effect sensor (MR sensor), or a resolver can be employed.

The TAS 25 is provided on the pinion shaft 13. The TAS 25 is constituted by a combination of an absolute angle sensor 25a and a torque sensor 25b. The torque sensor 25b detects a torque that is applied to the pinion shaft 13 by a rotation operation of the steering wheel 11, as a steering torque $T_h$.

The absolute angle sensor 25a detects a rotation angle $\theta_{pa}$ of the pinion shaft 13 in a range exceeding 360°, as an absolute angle. As the absolute angle sensor 25a, for example, a type of sensor that transforms rotation of a driving gear rotating integrally with the pinion shaft 13 into rotation angles of two driven gears engaging with the driving gear and evaluates the rotation angle of the driving gear as the absolute angle based on the rotation angles of the two driven gears is employed. The absolute angle sensor 25a computes the rotation angle $\theta_{pa}$ of the pinion shaft 13, on the basis of a steering neutral position ($\theta_s=0°$) of the steering wheel 11 or a turning neutral position ($\theta_w=0°$) of the turning shaft 14 that corresponds to a straight movement state of the vehicle. Therefore, the rotation angle $\theta_{pa}$ of the pinion shaft 13 increases in a plus direction at the time of a positive-directional rotation, and increases in a minus direction at the time of a reverse-directional rotation, on the basis of 0°, at which the steering wheel 11 corresponds to the steering neutral position.

Incidentally, in the steering apparatus 10, the steering wheel 11, the steering shaft 12 and the pinion shaft 13 integrally rotate. Therefore, the rotation angle $\theta_{pa}$ of the pinion shaft 13 is a value equal to the steering angle $\theta_s$, which is the rotation angle of the steering wheel 11.

The control device 26 takes in a steering torque $T_h$ that is detected through the torque sensor 25b of the TAS 25 and a vehicle speed V that is detected through a vehicle speed sensor 27 provided in the vehicle. The control device 26 executes an assist control to generate the steering assistance force (assist force) corresponding to the steering torque $T_h$ and the vehicle speed V, through an energization control for the assist motor 21.

The control device 26 takes in the rotation angle $\theta_{pa}$ of the pinion shaft 13 that is detected through the absolute angle sensor 25a of the TAS 25, as the steering angle $\theta_s$. Further, the control device 26 takes in the rotation angle $\theta_m$ of the assist motor 21 that is detected through the relative angle sensor 24. The control device 26 executes a compensation control for realizing a better steering feeling, using the steering angle $\theta_s$.

In some cases, the absolute angle sensor 25a of the TAS 25 has a lower resolution power than the relative angle sensor that detects the rotation angle $\theta_m$ of the assist motor 21. Therefore, the control device 26 computes the steering angle $\theta_s$ as the absolute value, using the rotation angle $\theta_m$ of the assist motor 21 that is detected through the relative angle sensor 24 and the rotation angle $\theta_{pa}$ of the pinion shaft 13 that is detected through the absolute angle sensor 25a of the TAS 25, and executes the above compensation control and the like, using the computed steering absolute angle.

Figure 2:
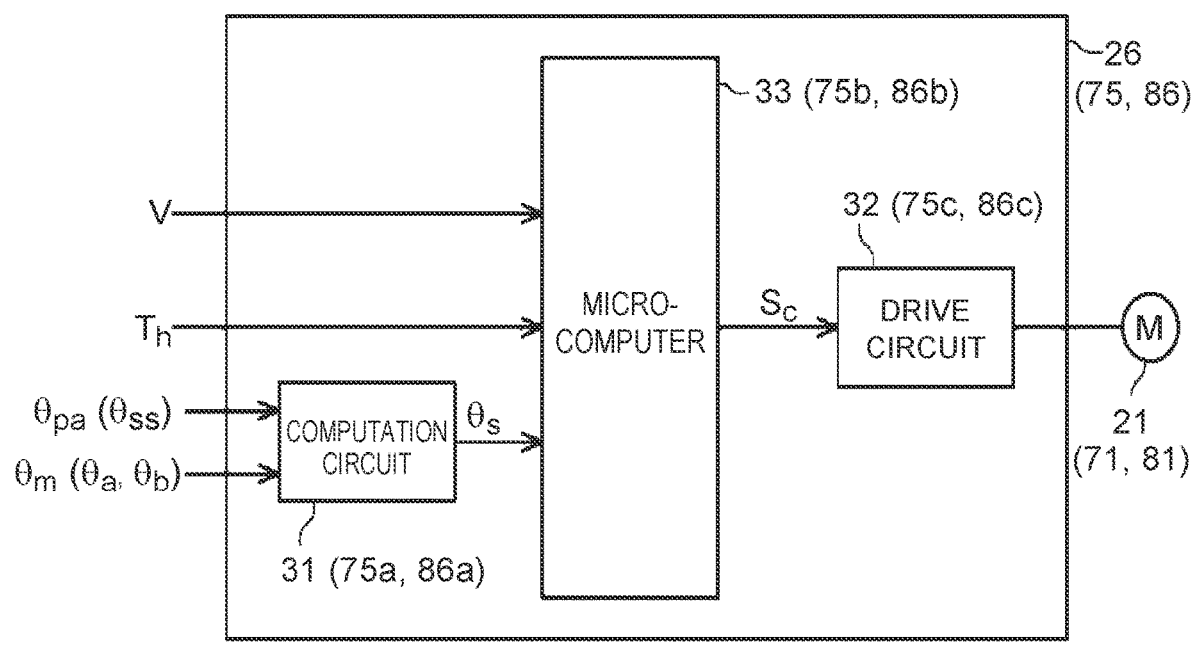
FIG. 2 is a block diagram of the motor control device of the first embodiment.

Next, the control device 26 will be described in detail. As shown in FIG. 2, the control device 26 includes a computation circuit 31, a drive circuit 32 and a microcomputer 33.

When an electric power source switch that is operated for actuating a vehicle traveling drive source such as an engine is turned on, operating electric power is supplied from an in-vehicle battery to the computation circuit 31, the drive circuit 32 and the microcomputer 33. When the electric power source switch is turned on, operating electric power is supplied from the battery also to various in-vehicle sensors including the relative angle sensor 24, the TAS 25 and the vehicle speed sensor 27.

The computation circuit 31 takes in the rotation angle $\theta_m$ of the assist motor 21 that is detected through the relative angle sensor 24 and the rotation angle $\theta_{pa}$ of the pinion shaft 13 that is detected through the absolute angle sensor 25a of the TAS 25, and computes the steering angle $\theta_s$ in the range exceeding 360°, as the absolute angle, using the taken rotation angles $\theta_m$, $\theta_{pa}$. The computation circuit 31 will be described later in detail.

The drive circuit 32 is a PWM inverter in which two switching elements such as field effect transistors (FET) connected in series are adopted as a leg that is a base unit and three legs corresponding to the respective phases of three phases (U, V and W) are connected in parallel. The drive circuit 32 transforms direct-current power that is supplied from the battery, into three-phase alternating-current power, based on a control signal $S_c$ that is generated by the microcomputer 33. The three-phase alternating-current power is supplied to the assist motor 21 through electricity supply paths for the respective phases.

The microcomputer 33 computes a target assist force based on the steering torque $T_h$ and the vehicle speed V, and computes a current command value that is a target value of electric current necessary to cause the assist motor 21 to generate the target assist force. The microcomputer 33 generates the control signal $S_c$ for the drive circuit 32, through execution of an electric current feedback control by which the actual current value that is supplied to the assist motor 21 follows up the current command value. The control signal $S_c$ specifies duty ratios of the switching elements of the drive circuit 32. The switching elements of the drive circuit 32 are switched based on the control signal $S_c$, and thereby the electric current corresponding to the current command value is supplied to the assist motor 21. Thereby, the assist motor 21 generates a rotation force corresponding to the target assist force.

Figure 3:
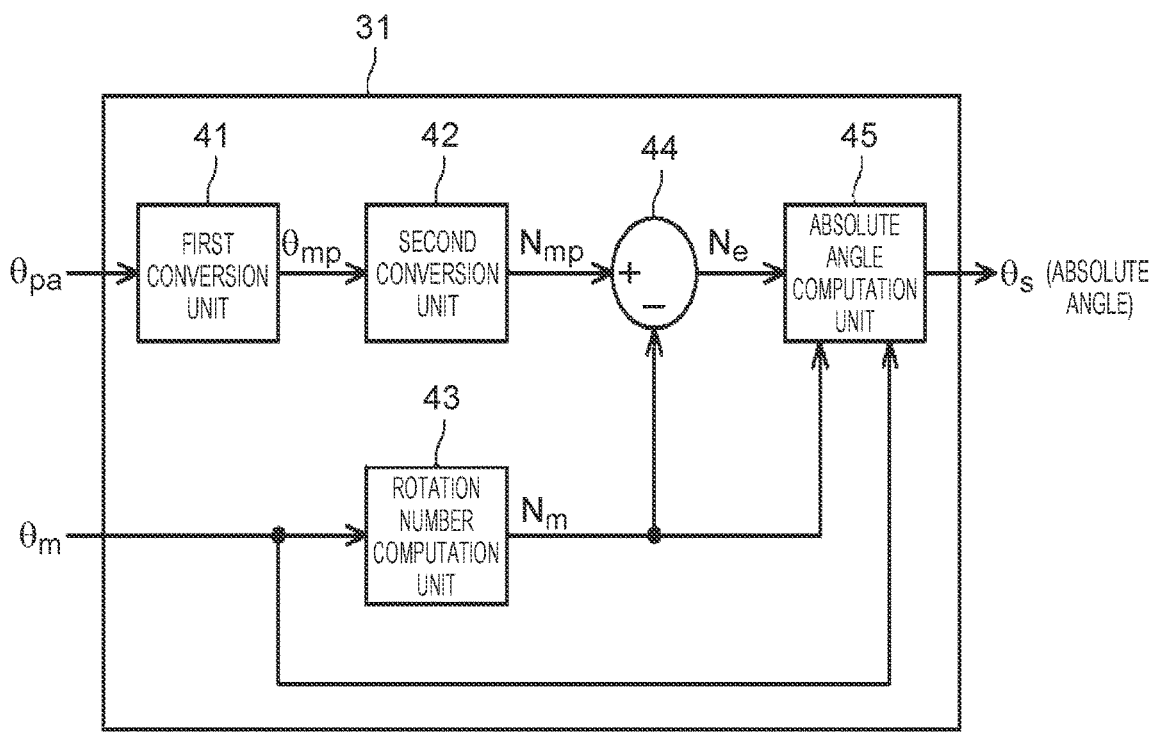
FIG. 3 is a block diagram of a computation circuit in a comparative example.

Next, the computation circuit 31 will be described in detail. As the computation circuit 31, for example, the following configuration in a comparative example can be employed. As shown in FIG. 3, the computation circuit 31 includes a first conversion unit 41, a second conversion unit 42, a rotation number computation unit 43, a subtractor 44 and an absolute angle computation unit 45.

The first conversion unit 41 computes a conversion value $\theta_{mp}$ resulting from converting the rotation angle $\theta_{pa}$ of the pinion shaft 13 that is detected through the absolute angle sensor 25a of the TAS 25, into the rotation angle of the assist motor 21.

The pinion shaft 13 and the assist motor 21 interlock with each other through the turning shaft 14, the pinion shaft 23 and the speed reducer 22, and therefore, there is a correlation between the rotation angle $\theta_{pa}$ of the pinion shaft 13 and the rotation angle $\theta_m$ of the assist motor 21. Accordingly, it is possible to evaluate the rotation angle of the assist motor 21 based on the rotation angle $\theta_{pa}$ of the pinion shaft 13.

The first conversion unit 41 computes the conversion value $\theta_{mp}$, for example, based on the following Expression (A).

$$\theta_{mp}=\theta_{pa}\cdot G_r \quad (A)$$

where "$G_r$" is a reduction ratio from the pinion shaft 13 to the speed reducer 22.

The second conversion unit 42 computes a conversion value $N_{mp}$ resulting from converting the conversion value $\theta_{mp}$ that is computed by the first conversion unit 41, into the rotation number of the assist motor 21, for example, based on the following Expression (B).

$$N_{mp}=\theta_{mp}/360° \quad (B)$$

where "360°" is a rotation angle when the assist motor 21 performs one rotation.

The rotation number computation unit 43 computes a rotation number $N_m$ of the assist motor 21, based on the rotation angle $\theta_m$ of the assist motor 21 that is detected through the relative angle sensor 24. For example, the rotation number computation unit 43 counts up the rotation number $N_m$ of the assist motor 21, whenever the rotation angle $\theta_m$ of the assist motor 21 that is detected through the relative angle sensor 24 exceeds 360°. The rotation number computation unit 43 counts the rotation number $N_m$ of the assist motor 21 from zero rotation, when the electric power source switch of the vehicle is switched from an off-state to an on-state.

The subtractor 44 computes a correction value $N_e$ for the rotation number $N_m$, by subtracting the rotation number $N_m$ of the assist motor 21 that is computed by the rotation number computation unit 43, from the conversion value $N_{mp}$ that is computed by the second conversion unit 42, as shown by the following Expression (C).

$$N_e = N_{mp} - N_m \quad (C)$$

The correction value $N_e$ is "0", when the conversion value $N_{mp}$ corresponding to the rotation angle of the assist motor 21 that is computed by the second conversion unit 42 is the same value as the rotation number $N_m$ of the assist motor 21 that is computed by the rotation number computation unit 43. In a period during which the electric power source switch of the vehicle is in the off-state, in the case where an external force is given to the steering wheel 11 and thereby the assist motor 21 rotates through the steering shaft 12, the rotation of the assist motor 21 appears as the correction value $N_e$. The correction value $N_e$ can be a positive value and can be a negative value, depending on the rotation direction of the steering shaft 12 and furthermore the rotation direction of the assist motor 21.

The absolute angle computation unit 45 corrects the rotation number $N_m$ of the assist motor 21 that is computed by the rotation number computation unit 43, using the correction value $N_e$ that is computed by the subtractor 44. For example, the absolute angle computation unit 45 computes a final rotation number $N_m'$ that is used for the computation of the steering absolute angle, by adding the correction value $N_e$ that is computed by the subtractor 44, to the rotation number $N_m$ of the assist motor 21 that is computed by the rotation number computation unit 43, as shown by the following Expression (D).

$$N_m' = N_m + N_e \quad (D)$$

where "$N_m$" is the rotation number of the assist motor 21 that is computed by the rotation number computation unit 43, and "$N_e$" is the correction value $N_e$ that is computed by the subtractor 44.

The final rotation number $N_m'$ that is computed by the subtractor 44 is a rotation number on the basis of the rotation angle $\theta_m$ (referred to as a "motor neutral point", hereinafter) of the assist motor 21 that corresponds to the steering neutral position of the steering wheel 11 or the turning neutral position of the turning shaft 14.

The absolute angle computation unit 45 computes the steering angle $\theta_s$ as the absolute angle, using the rotation number $N_m'$ after the correction and the rotation angle $\theta_m$ of the assist motor 21 that is detected through the relative angle sensor 24. As shown by the following Expression (E), the absolute angle computation unit 45 computes the rotation angle $\theta_m$ of the assist motor 21 as the absolute angle in the range exceeding 360°, using the motor neutral point of the assist motor 21 as a reference point, based on the change amount of the rotation angle $\theta_m$ of the assist motor 21 from the reference point, and computes the rotation angle $\theta_{pa}$ of the pinion shaft 13 as the steering angle $\theta_s$, based on the computed rotation angle $\theta_m$.

$$\theta_s = \theta_{pa} = (\theta_m + N_m' \cdot 360°)/G_r \quad (E)$$

where "$N_m$" is the rotation number of the assist motor 21 after the correction that is computed by the subtractor 44. "$G_r$" is the reduction ratio in the range from the pinion shaft 13 to the speed reducer 22. Information indicating the reduction ratio $G_r$ is stored in an unillustrated storage device of the control device 26.

Incidentally, it is possible that a configuration excluding the rotation number computation unit 43 and the subtractor 44 is employed as the computation circuit 31. Even in this case, the absolute angle computation unit 45 can compute the rotation angle $\theta_{pa}$ of the pinion shaft 13 as the absolute angle, based on the conversion value $N_{mp}$ corresponding to the rotation number of the assist motor 21 that is computed by the second conversion unit 42 and the rotation angle $\theta_m$ of the assist motor 21 that is detected through the relative angle sensor 24. In this case, the final rotation number $N_m'$ in Expression (E) is replaced with the conversion value $N_{mp}$ that is computed by the second conversion unit 42.

With the computation circuit 31 configured in this way, it is possible to obtain the conversion value $N_{mp}$ corresponding to the rotation number $N_m$ of the assist motor 21, based on the rotation angle $\theta_{pa}$ of the pinion shaft 13 that is detected through the absolute angle sensor 25a of the TAS 25. When the electric power source switch of the vehicle is switched from the off-state to the on-state, the absolute angle sensor 25a can immediately detect the rotation angle $\theta_{pa}$ of the pinion shaft 13 as the absolute angle. Therefore, when the electric power source switch of the vehicle is switched from the off-state to the on-state, it is possible to immediately compute the conversion value $N_{mp}$ corresponding to the rotation number of the assist motor 21 on the basis of the motor neutral point. Accordingly, it is not necessary to monitor the rotation number $N_m$ of the assist motor 21 in a period during which the electric power source switch of the vehicle is in the off-state. Therefore, it is possible to restrain electric power consumption in the period during which the electric power source switch of the vehicle is in the off-state.

Further, when the electric power source switch of the vehicle is switched from the off-state to the on-state, it is possible to immediately obtain the rotation number $N_m$ of the assist motor 21 on the basis of the motor neutral point, by correcting the rotation number $N_m$ of the assist motor 21 that is computed by the rotation number computation unit 43, using the conversion value $N_{mp}$ that is computed by the second conversion unit 42. It is possible to immediately obtain the rotation angle $\theta_{pa}$ of the pinion shaft 13 and furthermore the steering angle $\theta_s$ as the absolute angle, based on the rotation number $N_m$ of the assist motor 21 on the basis of the motor neutral point and the rotation angle $\theta_m$ of the assist motor 21 that is detected through the relative angle sensor 24. It is possible to secure the computation accuracy of the rotation angle $\theta_{pa}$ of the pinion shaft 13 and furthermore the steering angle $\theta_s$, by using the rotation angle $\theta_m$ of the relative angle sensor 24 having a higher resolution power than the absolute angle sensor 25a of the TAS 25.

However, there is a concern described below in the computation circuit 31. That is, the assist motor 21 and the pinion shaft 13 that is a rotation detection object are mechanically coupled through the speed reducer 22, the pinion shaft 23 and the turning shaft 14. Therefore, there is a fear that the conversion value $N_{mp}$ that is computed based on the rotation angle $\theta_{pa}$ of the pinion shaft 13 is influenced by a backlash, an erection tolerance or the like on a dynamic force transmission path between the speed reducer 22 and the pinion shaft 13. There is a concern that the actual rotation number of the assist motor 21 on the basis of the motor neutral point is different from the conversion value $N_{mp}$ corresponding to the rotation number of the assist motor 21 that is obtained based on the rotation angle $\theta_{pa}$ of the pinion shaft 13 due to the influence. In this case, there is a fear of decrease in the computation accuracy of the correction value $N_e$ that is computed using the conversion value $N_{mp}$, and furthermore decrease in the computation accuracy of the rotation angle $\theta_{pa}$ of the pinion shaft that is computed by the absolute angle computation unit 45.

Figure 4:
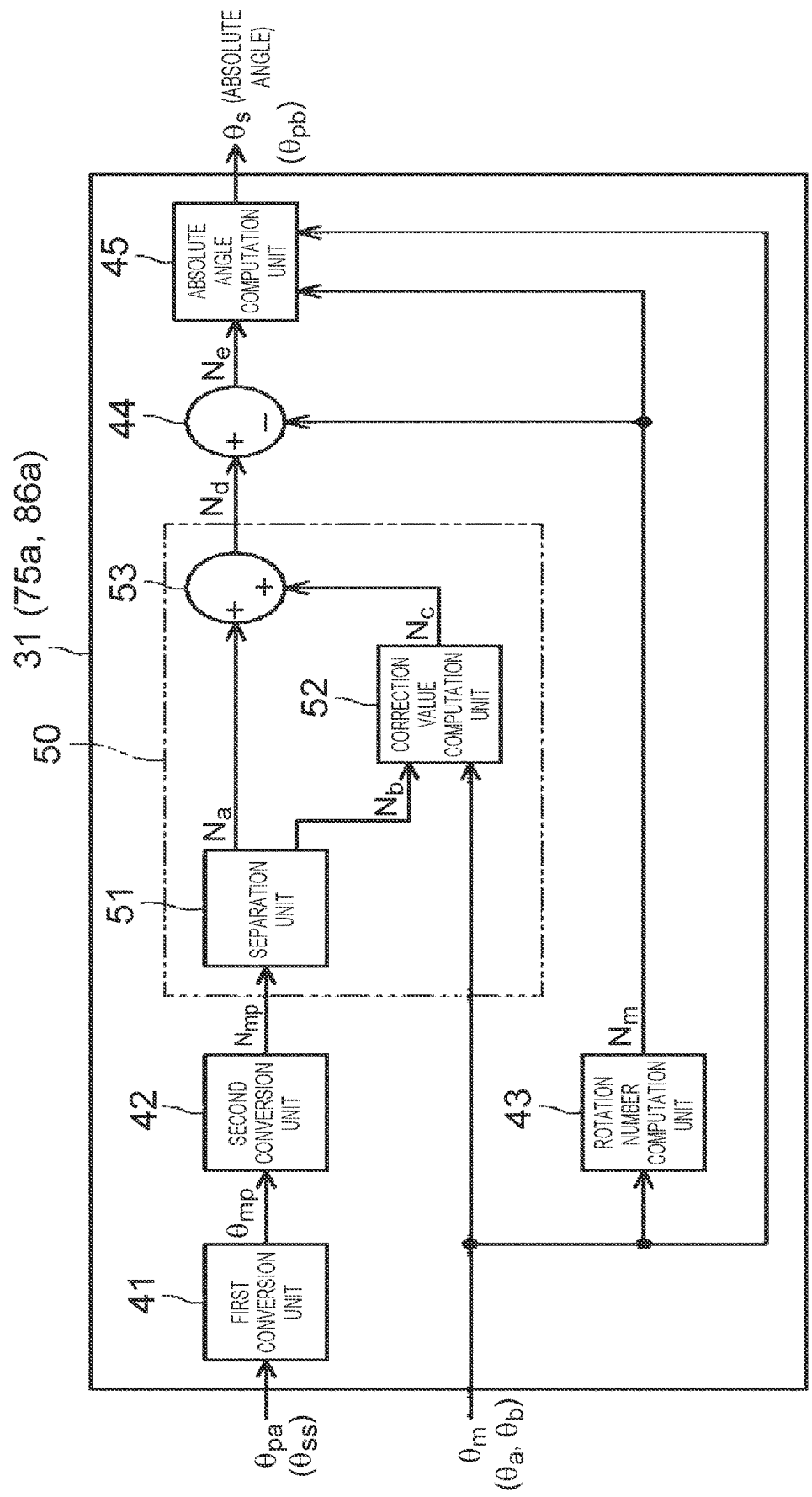
FIG. 4 is a block diagram of a computation circuit in the first embodiment.

Hence, in the embodiment, the following configuration is employed as the computation circuit 31. As shown in FIG. 4, the computation circuit 31 includes a correction processing unit 50, in addition to the first conversion unit 41, the second conversion unit 42, the rotation number computation unit 43, the subtractor 44 and the absolute angle computation unit 45 described above. The correction processing unit 50 performs a correction process for the conversion value $N_{mp}$ that is computed by the second conversion unit 42. The correction processing unit 50 includes a separation unit 51, a correction value computation unit 52 and an adder 53.

On the premise that the conversion value $N_{mp}$ that is computed by the second conversion unit 42 includes an integer part and a decimal part, the separation unit 51 separates an integer part $N_a$ and decimal part $N_b$ of the conversion value $N_{mp}$. The integer part $N_a$ of the conversion value $N_{mp}$ corresponds to the rotation number of the assist motor 21. The decimal part $N_b$ of the conversion value $N_{mp}$ corresponds to the rotation angle of the assist motor 21. That is, on the assumption that there is no backlash or erection tolerance on the dynamic force transmission path between the speed reducer 22 and the pinion shaft 13 and each constituent element on the dynamic force transmission path is a rigid body, the rotation angle $\theta_m$ of the assist motor 21 can be expressed as the following Expression (F1).

$$\theta_m = N_b \cdot 360° \quad (F1)$$

where "$N_b$" is the decimal part of the conversion value $N_{mp}$ that is computed by the second conversion unit 42. "360°" is a rotation angle when the assist motor 21 performs one rotation.

The correction value computation unit 52 computes a correction value $N_c$ for the conversion value $N_{mp}$ that is computed by the second conversion unit 42, focusing on the fact that the decimal part $N_b$ that is separated by the separation unit 51 is a value corresponding to the rotation angle of the assist motor 21. The computation of the correction value $N_c$ by the correction value computation unit 52 is performed on the premise that the difference between the rotation angle $\theta_m$ of the assist motor 21 that is detected through the relative angle sensor 24 and a conversion value $\theta_{nb}$ resulting from converting the value of the decimal part $N_b$ into the rotation angle of the assist motor 21 falls within a range of "±180°", as shown by the following Expression (F2). The correction value computation unit 52 will be described later in detail.

$$-180° < \theta_{nb} - \theta_m < 180° \quad (F2)$$

where "180°" is a rotation angle equivalent to half rotation in the positive direction on the basis of the motor neutral point of the assist motor 21, and "−180°" is a rotation angle equivalent to half rotation in the reverse direction on the basis of the motor neutral point of the assist motor 21.

The adder 53 computes a rotation number $N_d$ of the assist motor 21 on the basis of the motor neutral point corresponding to the steering neutral position or the turning neutral position of the turning shaft 14, by adding the correction value $N_c$ that is computed by the correction value computation unit 52, to the integer part $N_a$ that is separated by the separation unit 51.

Next, the correction value computation unit 52 will be described in detail. The correction value computation unit 52 computes the correction value $N_c$ from the following standpoint. As shown in FIG. 5A, when the value of the rotation angle $\theta_m$ of the assist motor 21 that is detected through the relative angle sensor 24 is plotted on a circumference, the value of the rotation angle $\theta_m$ of the assist motor 21 can be regarded as a moving point that moves on the circumference with the rotation of the assist motor 21. When the assist motor 21 rotates in the positive direction on the basis of the motor neutral point ($\theta_m=0°$) that is the neutral position of the assist motor 21, the value of the rotation angle $\theta_m$ of the assist motor 21 moves on the circumference in a counterclockwise direction in FIG. 5A. When the assist motor 21 rotates in the reverse direction on the basis of the motor neutral position that is the neutral position of the assist motor 21, the value of the rotation angle $\theta_m$ of the assist motor 21 moves on the circumference in a clockwise direction in FIG. 5A. FIG. 5A shows angles 90°, 180° and −270°, which are equivalent to one-quarter rotation, two-quarter rotation and three-quarter rotation of the assist motor 21 in the positive direction on the basis of the motor neutral point. Further, in parentheses, FIG. 5A shows angles −90°, −180° and −270°, which are equivalent to one-quarter rotation, two-quarter rotation and three-quarter rotation of the assist motor 21 in the reverse direction on the basis of the motor neutral point.

As shown in FIG. 5B, when the value of the decimal part $N_b$ of the conversion value $N_{mp}$ that is computed by the second conversion unit 42 is plotted on a circumference, the value of the decimal part $N_b$ can be regarded as a moving point that moves on the circumference. When the assist motor 21 rotates in the positive direction on the basis of the motor neutral point that is the neutral position of the assist motor 21, the value of the decimal part $N_b$ of the conversion value $N_{mp}$ based on the rotation angle $\theta_{pa}$ of the pinion shaft 13 that rotates while interlocking with the assist motor 21 moves on the circumference in a counterclockwise direction in FIG. 5B. When the assist motor 21 rotates in the reverse direction on the basis of the motor neutral point that is the neutral position of the assist motor 21, the value of the decimal part $N_b$ of the conversion value $N_{mp}$ based on the rotation angle $\theta_{pa}$ of the pinion shaft 13 that rotates while interlocking with the assist motor 21 moves on the circumference in a clockwise direction in FIG. 5B. FIG. 5B shows values of decimal parts $N_b$ corresponding to angles that are equivalent to one-quarter rotation, two-quarter rotation and three-quarter rotation of the assist motor 21 in the positive direction on the basis of the motor neutral point, that is, "0.25, 0.5, 0.75". Further, in parentheses, FIG. 5B shows values of decimal parts $N_b$ corresponding to angles that are equivalent to one-quarter rotation, two-quarter rotation and three-quarter rotation of the assist motor 21 in the reverse direction on the basis of the motor neutral point, that is, "−0.25, −0.5, −0.75".

In the case where the conversion value $\theta_{nb}$ resulting from converting the value of the decimal part $N_b$ into the rotation angle $\theta_m$ of the assist motor 21 is correct, the conversion value $\theta_{nb}$ is the same value as the rotation angle $\theta_m$ of the assist motor 21 that is detected through the relative angle sensor 24. That is, in the case where the value of the conversion value $\theta_{nb}$ is correct, the value of the decimal part $N_b$ shown by a point P1 in FIG. 5B is a value corresponding to the value of the rotation angle $\theta_m$ of the assist motor 21 that is detected through the relative angle sensor 24 and that is shown by a point P1' in FIG. 5A.

However, actually, in some cases, the value of the conversion value $\theta_{nb}$ resulting from converting the value of the decimal part $N_b$ into the rotation angle $\theta_m$ of the assist motor 21 is not the same value as the rotation angle $\theta_m$ of the assist motor 21 that is detected through the relative angle sensor 24, due to the erection tolerance or the like on the dynamic force transmission path. That is, although the value of the decimal part $N_b$ is the value shown by the point P1 in FIG. 5B and corresponding to the point P1' in FIG. 5A in the case where the conversion value $\theta_{nb}$ is correct, the actual decimal part $N_b$ is a value shown by one of points P2, P3, P4, P5 in FIG. 5B, for example.

In this respect, with the embodiment, it is possible to compute the conversion value $N_{mp}$ corresponding to the rotation number of the assist motor 21, more specifically, the correction value $N_c$ for the integer part $N_a$ of the conversion value $N_{mp}$, through the comparison between the conversion value $\theta_{nb}$ resulting from converting the value of the decimal part $N_b$ into the rotation angle $\theta_m$ of the assist motor 21 and the rotation angle $\theta_m$ of the assist motor 21 that is detected through the relative angle sensor 24. Here, there is the premise that the rotation angle $\theta_m$ of the assist motor 21 that is detected through the relative angle sensor 24 is correct and that the above Expression (F2) is satisfied.

As a first example, in a state where the assist motor 21 is rotating in the positive direction, in the case where the value of the decimal part $N_b$ of the conversion value $N_{mp}$ is a value in a range expressed by the following Expression (G1) and where the value of the rotation angle $\theta_m$ of the assist motor 21 that is detected through the relative angle sensor 24 is a value in a range expressed by the following Expression (G2) as shown in FIG. 6A and FIG. 6B, it can be said that the conversion value $N_{mp}$ corresponding to the rotation number of the assist motor 21 is a correct value. The difference between the conversion value $\theta_{nb}$ (0° to 45°) resulting from converting the value of the decimal part $N_b$ into the rotation angle $\theta_m$ of the assist motor 21 and the value of the rotation angle $\theta_m$ of the assist motor 21 that is detected through the relative angle sensor 24 is a value within ±180°, which is an acceptable range, and therefore it is found that the decimal part $N_b$ is a value in the same rotation number corresponding to the rotation angle $\theta_m$ of the assist motor 21. Therefore, the correction value $N_c$ for the integer part $N_a$ is set to "0".

$$0 \leq N_b < 0.125 \tag{G1}$$

$$0° \leq \theta_m < 45° \tag{G2}$$

Figure 7A:
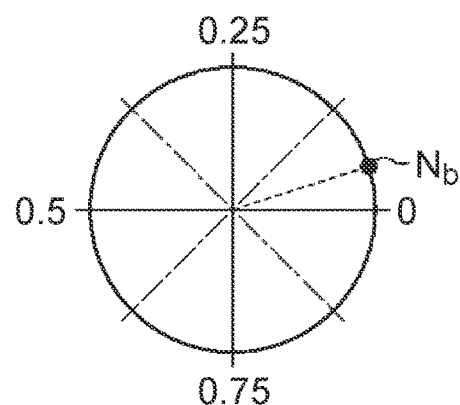
FIG. 7A is a unit circle showing the decimal part of the rotation number conversion value of the motor that is computed based on the rotation angle of the pinion shaft that is detected through the absolute angle sensor.
Figure 7B:
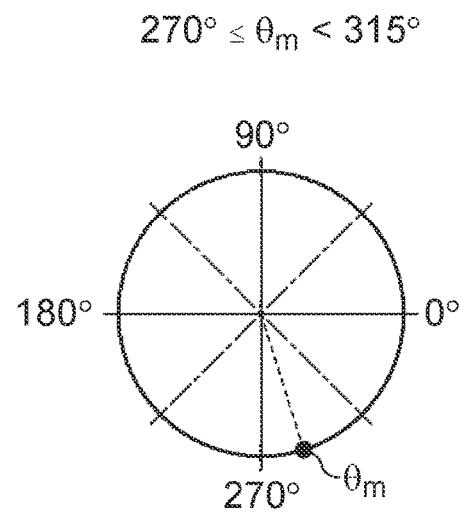
FIG. 7B is a unit circle showing the rotation angle of the motor that is detected through the relative angle sensor.

As a second example, in the state where the assist motor 21 is rotating in the positive direction, in the case where the value of the decimal part $N_b$ of the conversion value $N_{mp}$ is a value in a range expressed by the following Expression (H1) and where the value of the rotation angle $\theta_m$ of the assist motor 21 that is detected through the relative angle sensor 24 is a value in a range expressed by the following Expression (H2) as shown in FIG. 7A and FIG. 7B, it can be said that the conversion value $N_{mp}$ corresponding to the rotation number of the assist motor 21 is an incorrect value. This is because the difference between the conversion value $\theta_{nb}$ (0° to 45°) resulting from converting the value of the decimal part $N_b$ into the rotation angle $\theta_m$ of the assist motor 21 and the value of the rotation angle $\theta_m$ of the assist motor 21 that is detected through the relative angle sensor 24 is a value exceeding "±180°", which is the acceptable range. Further, in this case, it is found that the rotation angle $\theta_m$ of the assist motor 21 is a value at the previous rotation relative to the decimal part $N_b$, for example, that when the assist motor 21 performs an $N_{n-1}$-th rotation, the decimal part $N_b$ is at a position corresponding to an $N_n$-th rotation of the assist motor 21. Therefore, the correction value $N_c$ for the integer part $N_a$ is set to "−1".

$$0 \leq N_b < 0.125 \tag{H1}$$

$$270° \leq \theta_m < 315° \tag{H2}$$

This is thought in the following way.

Figure 8:
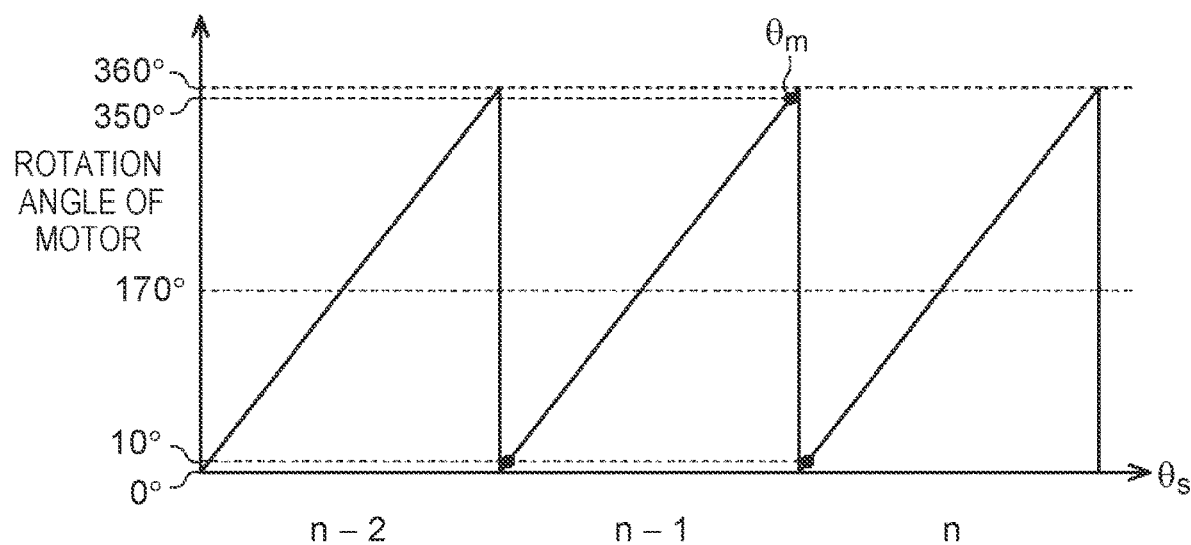
FIG. 8 is a graph showing a relation between a steering angle and the rotation angle of the motor in the first embodiment.

As shown in a graph of FIG. 8, with change in the steering angle $\theta_s$, the rotation angle $\theta_m$ of the assist motor 21 that is detected through the relative angle sensor 24 repeats rising and falling in a range of "0° to 360°", in a predetermined cycle. Here, for example, a case where the rotation angle $\theta_m$ of the assist motor 21 that is detected through the relative angle sensor 24 is 350° at an n−1-th rotation of the assist motor 21 and where the conversion value $\theta_{nb}$ resulting from converting the value of the decimal part $N_b$ into the rotation angle $\theta_m$ of the assist motor 21 is 10° at an n-th rotation of the assist motor 21 will be discussed. In this case, it is unknown whether 10° as the conversion value $\theta_{nb}$ resulting from converting the value of the decimal part $N_b$ into the rotation angle $\theta_m$ of the assist motor 21 is a value at the n−1-th rotation of the assist motor 21 or a value at the n-th rotation of the assist motor 21, from the position of the rotation angle $\theta_m$ of the assist motor 21 that is detected through the relative angle sensor 24.

However, in the embodiment, there is the premise that the difference between the rotation angle $\theta_m$ of the assist motor 21 that is detected through the relative angle sensor 24 and the conversion value $\theta_{nb}$ resulting from converting the value of the decimal part $N_b$ into the rotation angle $\theta_m$ of the assist motor 21 falls within the range of "±180°". Further, 10° at the n−1-th rotation of the assist motor 21 is a value outside the range of ±180° on the basis of the rotation angle $\theta_m$ of the assist motor 21. On the other hand, 10° at the n-th rotation of the assist motor 21 is a value inside the acceptable range of ±180° on the basis of the rotation angle $\theta_m$ of the assist motor 21. Therefore, it is found that 10° as the conversion value $\theta_{nb}$ resulting from converting the value of the decimal part $N_b$ into the rotation angle $\theta_m$ of the assist motor 21 is not the value at the n−1-th rotation of the assist motor 21 but the value at the n-th rotation of the assist motor 21. Accordingly, it is found that the correction value $N_c$ for the conversion value $N_{mp}$ may be set to "−1".

Computation Processing Procedure for Correction Value $N_c$

Next, a computation processing procedure for the correction value $N_c$ that is executed by the correction value computation unit 52 will be described in accordance with a flowchart of FIG. 9. Processes in the flowchart are executed when the electric power source switch of the vehicle is switched from the off-state to the on-state.

Figure 9:
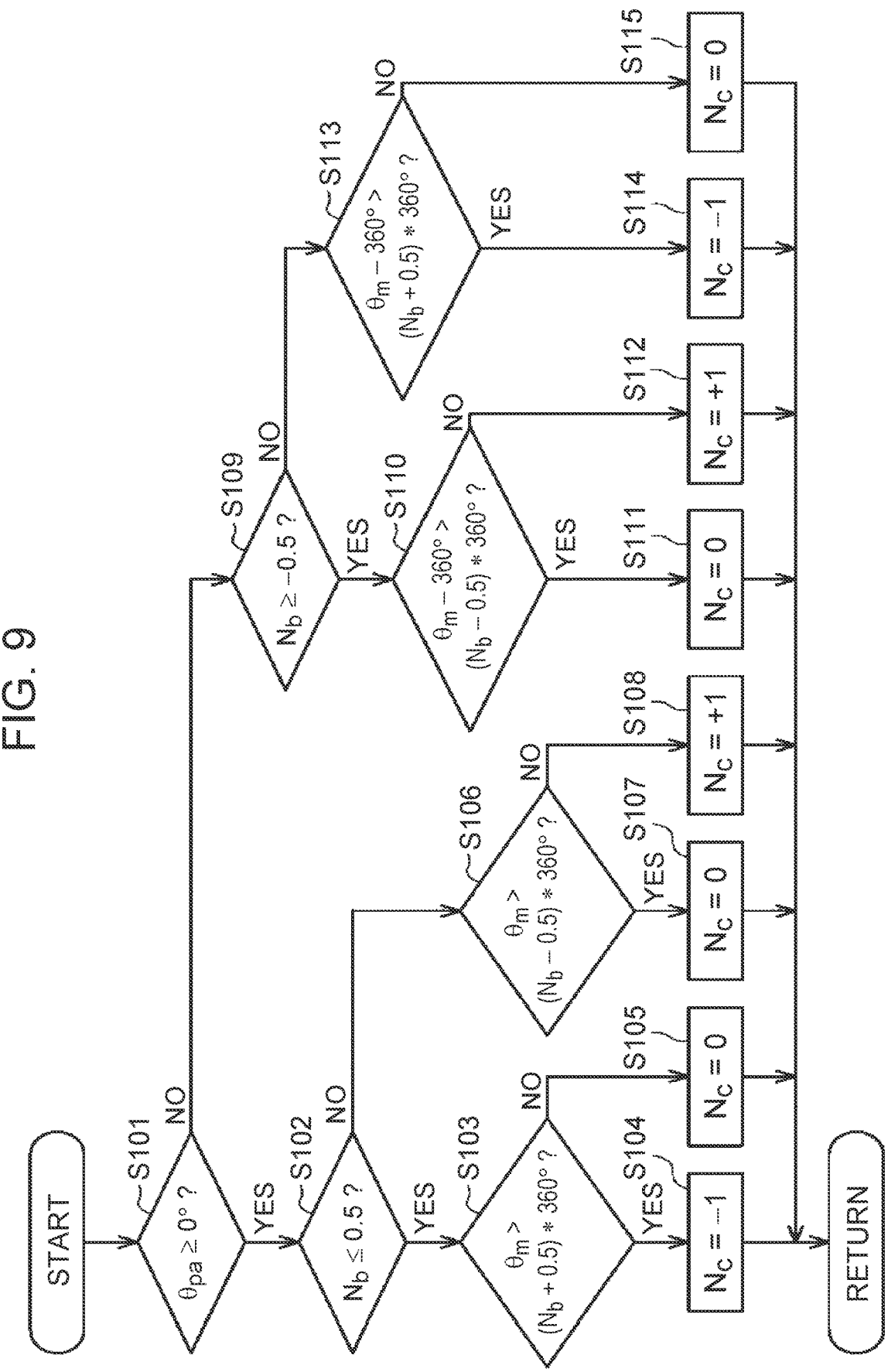
FIG. 9 is a flowchart showing a computation processing procedure for a correction value that is executed by a correction value computation unit in the first embodiment.

As shown in the flowchart of FIG. 9, the correction value computation unit 52 determines whether the value of the rotation angle $\theta_{pa}$ of the pinion shaft 13 that is detected through the absolute angle sensor 25a of the TAS 25 is equal to or larger than "0", as shown by the following Expression (I) (step S101).

$$\theta_{pa} \geq 0 \tag{I}$$

When it is determined that the value of the rotation angle $\theta_{pa}$ of the pinion shaft 13 is equal to or larger than "0" (YES in step S101), the correction value computation unit 52 determines whether the value of the decimal part $N_b$ of the conversion value $N_{mp}$ that is computed by the second conversion unit 42 is equal to or smaller than "0.5", as shown by the following Expression (J) (step S102). Here, "0.5" in the value of the decimal part $N_b$ is a value corresponding to 180° in the rotation angle $\theta_m$ of the assist motor 21.

$$N_b \leq 0.5 \tag{J}$$

When it is determined that the decimal part $N_b$ of the conversion value $N_{mp}$ is equal to or smaller than "0.5" (YES in step S102), the correction value computation unit 52 determines whether the rotation angle $\theta_m$ of the assist motor 21 is a larger value than a threshold resulting from converting the value of the decimal part $N_b$ of the conversion value $N_{mp}$ after addition of "0.5" into the rotation angle $\theta_m$ of the assist motor 21, as shown by the following Expression (K) (step S103).

$$\theta_m > (N_b + 0.5) \cdot 360° \quad (K)$$

When it is determined that the rotation angle $\theta_m$ of the assist motor 21 is a larger value than the threshold resulting from converting the value of the decimal part $N_b$ of the conversion value $N_{mp}$ after addition of "0.5" into the rotation angle $\theta_m$ of the assist motor 21 (YES in step S103), the correction value computation unit 52 sets "−1" as the correction value $N_c$ (step S104), and ends the process. This process is executed, for example, under the situation shown in FIG. 7A and FIG. 7B. When it is determined that the rotation angle $\theta_m$ of the assist motor 21 is not a larger value than the threshold resulting from converting the value of the decimal part $N_b$ of the conversion value $N_{mp}$ after addition of "0.5" into the rotation angle $\theta_m$ of the assist motor 21 (NO in step S103), the correction value computation unit 52 sets "0" as the correction value $N_c$ (step S105), and ends the process. This process is executed, for example, under the situation shown in FIG. 6A and FIG. 6B.

When it is determined in step S102 that the decimal part $N_b$ of the conversion value $N_{mp}$ is larger than "0.5" (NO in step S102), the correction value computation unit 52 determines whether the rotation angle $\theta_m$ of the assist motor 21 is a larger value than a threshold resulting from converting the value of the decimal part $N_b$ after subtraction of "0.5" into the rotation angle $\theta_m$ of the assist motor 21, as shown by the following Expression (L) (step S106).

$$\theta_m (N_b - 0.5) \cdot 360° \quad (L)$$

When it is determined that the rotation angle $\theta_m$ of the assist motor 21 is a larger value than the threshold resulting from converting the value of the decimal part $N_b$ of the conversion value $N_{mp}$ after subtraction of "0.5" into the rotation angle $\theta_m$ of the assist motor 21 (YES in step S106), the correction value computation unit 52 sets "0" as the correction value $N_c$ (step S107), and ends the process. When it is determined that the rotation angle $\theta_m$ of the assist motor 21 is not a larger value than the threshold resulting from converting the value of the decimal part $N_b$ of the conversion value $N_{mp}$ after subtraction of "0.5" into the rotation angle $\theta_m$ of the assist motor 21 (NO in step S106), the correction value computation unit 52 sets "+1" as the correction value $N_c$ (step S108), and ends the process.

When it is determined in step S101 that the value of the rotation angle $\theta_{pa}$ of the pinion shaft 13 is smaller than "0" (NO in step S101), the correction value computation unit 52 determines whether the value of the decimal part $N_b$ of the conversion value $N_{mp}$ that is computed by the second conversion unit 42 is equal to or larger than "−0.5", as shown by the following Expression (M) (step S109).

$$N_b \geq -0.5 \quad (M)$$

When it is determined that the decimal part $N_b$ of the conversion value $N_{mp}$ is equal to or larger than "−0.5" (YES in step S109), the correction value computation unit 52 determines whether the value of the rotation angle $\theta_m$ of the assist motor 21 after subtraction of 360° is a larger value than a threshold resulting from converting the value of the decimal part $N_b$ of the conversion value $N_{mp}$ after subtraction of "0.5" into the rotation angle $\theta_m$ of the assist motor 21, as shown by the following Expression (N) (step S110).

$$\theta_m - 360° > (N_b - 0.5) \cdot 360° \quad (N)$$

When it is determined that the value of the rotation angle $\theta_m$ of the assist motor 21 after subtraction of 360° is a larger value than the threshold resulting from converting the value of the decimal part $N_b$ after subtraction of "0.5" into the rotation angle $\theta_m$ of the assist motor 21 (YES in step S110), the correction value computation unit 52 sets "0" as the correction value $N_c$ (step S111), and ends the process. When it is determined that the value of the rotation angle $\theta_m$ of the assist motor 21 after subtraction of 360° is not a larger value than the threshold resulting from converting the value of the decimal part $N_b$ after subtraction of "0.5" into the rotation angle $\theta_m$ of the assist motor 21 (NO in step S110), the correction value computation unit 52 sets "+1" as the correction value $N_c$ (step S112), and ends the process.

When it is determined that the decimal part $N_b$ of the conversion value $N_{mp}$ is smaller than "−0.5" (NO in step S109), the correction value computation unit 52 determines whether the value of the rotation angle $\theta_m$ of the assist motor 21 after subtraction of 360° is a larger value than a threshold resulting from converting the value of the decimal part $N_b$ of the conversion value $N_{mp}$ after addition of "0.5" into the rotation angle $\theta_m$ of the assist motor 21, as shown by the following Expression (O) (step S113).

$$\theta_m - 360° > (N_b + 0.5) \cdot 360° \quad (O)$$

When it is determined that the value of the rotation angle $\theta_m$ of the assist motor 21 after subtraction of 360° is a larger value than the threshold resulting from converting the decimal part $N_b$ after addition of "0.5" into the rotation angle $\theta_m$ of the assist motor 21 (YES in step S113), the correction value computation unit 52 sets "−1" as the correction value $N_c$ (step S114), and ends the process. When it is determined that the value of the rotation angle $\theta_m$ of the assist motor 21 after subtraction of 360° is not a larger value than the threshold resulting from converting the decimal part $N_b$ after addition of "0.5" into the rotation angle $\theta_m$ of the assist motor 21 (NO in step S113), the correction value computation unit 52 sets "0" as the correction value $N_e$ (step S115), and ends the process.

Effects of First Embodiment

Accordingly, with the first embodiment, the following effects can be obtained. The correction value $N_c$ for the integer part $N_a$ of the conversion value $N_{mp}$ is computed through the comparison between the value of the rotation angle $\theta_m$ of the assist motor 21 that is detected through the relative angle sensor 24 and the conversion value $\theta_{nb}$ corresponding to the rotation angle $\theta_m$ of the assist motor 21 within 360° that is computed based on the value of the decimal part $N_b$ of the conversion value $N_{mp}$. The correction value $N_e$ is added to the integer part $N_a$ of the conversion value $N_{mp}$, and thereby it is possible to obtain a more accurate rotation number $N_d$ of the assist motor 21 on the basis of the motor neutral point. The rotation number $N_m$ of the assist motor 21 that is computed by the rotation number computation unit 43 is corrected using the correction value $N_e$ as the difference between the rotation number $N_d$ that is computed by the correction processing unit 50 and the rotation number $N_m$ of the assist motor 21 that is computed by the rotation number computation unit 43, and thereby it is possible to obtain a more accurate rotation number $N_m$ of the assist motor 21 on the basis of the motor neutral point. It is possible to obtain the rotation angle $\theta_{pa}$ of the pinion shaft 13 and furthermore the steering angle $\theta_s$ as the absolute angle, based on the more accurate rotation number $N_m$ of the assist motor 21 and the rotation angle $\theta_m$ of the assist motor 21 that is detected through the relative angle sensor 24. It is possible to secure the computation accuracy of the rotation angle $\theta_{pa}$ of the pinion shaft 13 and furthermore the steering angle $\theta_s$, by using the rotation angle $\theta_m$ of the relative angle sensor 24 having a higher resolution power than the absolute angle sensor 25a.

When the electric power source switch of the vehicle is switched from the off-state to the on-state, the absolute angle sensor 25a immediately detects the rotation angle $\theta_{pa}$ of the pinion shaft 13 as the absolute angle. Therefore, when the electric power source switch of the vehicle is switched from the off-state to the on-state, the computation circuit 31 can immediately compute the conversion value $N_{mp}$ corresponding to the rotation number of the assist motor 21 on the basis of the motor neutral point. Accordingly, the computation circuit 31 does not need to monitor the rotation number $N_m$ of the assist motor 21 in the period during which the electric power source switch of the vehicle is in the off-state. Therefore, it is possible to restrain electric power consumption in the period during which the electric power source switch of the vehicle is in the off-state.

Second Embodiment

A second embodiment in which a motor control device is applied to a steer-by-wire-type steering apparatus will be described below.

Figure 10:
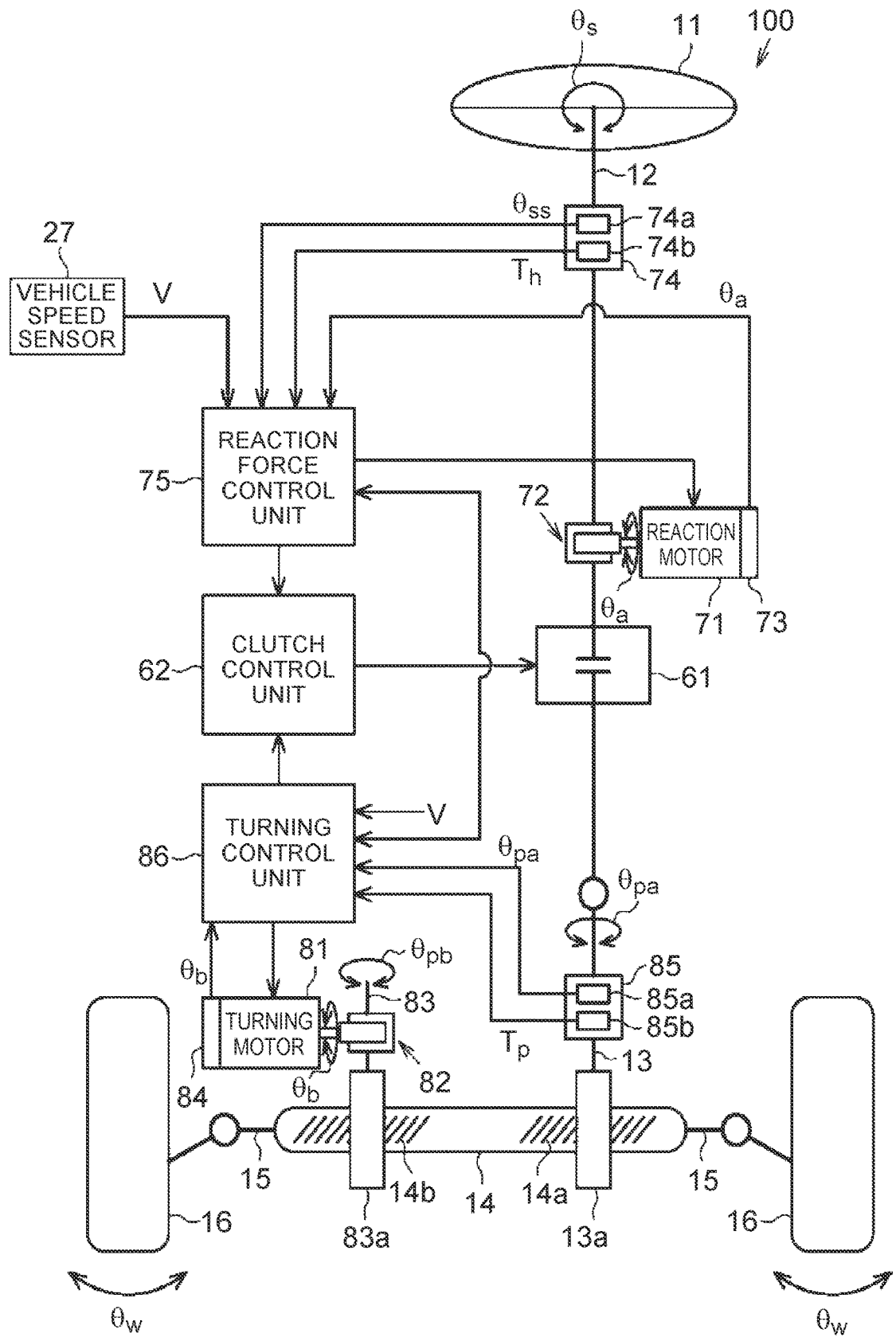
FIG. 10 is a configuration diagram of a steering apparatus that is equipped with a motor control device of a second embodiment.

As shown in FIG. 10, a steering apparatus 100 of a vehicle includes a steering shaft 12 that is coupled to a steering wheel 11. A pinion shaft 13 is provided at an end portion of the steering shaft 12 on the opposite side of the steering wheel 11. A pinion gear 13a of the pinion shaft 13 engages with a rack gear 14a of a turning shaft 14 that extends in a direction of crossing the pinion shaft 13. Right and left turning wheels 16 are coupled to both ends of the turning shaft 14 through tie rods 15, respectively.

The steering apparatus 100 includes a clutch 61 and a clutch control unit 62. The clutch 61 is provided in the middle of the steering shaft 12. As the clutch 61, an electromagnetic clutch that connects and disconnects dynamic force by electric connection and disconnection of an exciting coil is employed. When the clutch 61 is disconnected, the dynamic force transmission between the steering wheel 11 and the turning wheels 16 is mechanically disconnected. When the clutch 61 is connected, the dynamic force transmission between the steering wheel 11 and the turning wheels 16 is mechanically connected.

The clutch control unit 62 controls the connection and disconnection of the clutch 61. The clutch control unit 62 switches the clutch 61 from the connection state to the disconnection state, by performing energization of the exciting coil of the clutch 61. Further, the clutch control unit 62 switches the clutch 61 from the disconnection state to the connection state, by stopping the energization of the exciting coil of the clutch 61.

In the connection state of the clutch 61, the steering shaft 12, the pinion shaft 13 and the turning shaft 14 functions as a dynamic force transmission path between the steering wheel 11 and the turning wheels 16. That is, the turning shaft 14 moves linearly by the rotation operation of the steering wheel 11, so that a turning angle $\theta_w$ of the turning wheels 16 is altered.

The steering apparatus 100 includes a reaction motor 71, a speed reducer 72, a relative angle sensor 73, a TAS 74 and a reaction force control unit 75, as a configuration for generating a steering reaction force. Incidentally, the steering reaction force is a force (torque) that acts in an opposite direction of a direction of driver's operation of the steering wheel 11. By giving the steering reaction force to the steering wheel 11, it is possible to give a moderate sensation in driver's hands.

The reaction motor 71 is a generation source of the steering reaction force. As the reaction motor 71, for example, a brushless motor having three phases (U, V and W) is employed. The reaction motor 71 is coupled to the steering shaft 12 through the speed reducer 72. The speed reducer 72 is provided at a portion on the steering shaft 12 between the clutch 61 and the steering wheel 11. The torque of the reaction motor 71 is given to the steering shaft 12 as the steering reaction force.

The relative angle sensor 73 is provided on the reaction motor 71. The relative angle sensor 73 detects a rotation angle $\theta_a$ of the reaction motor 71, as a relative angle in a range from 0° to 360°. As the relative angle sensor 73, for example, various types of sensors including a magnetic sensor such as a Hall sensor or a magnetoresistance effect sensor (MR sensor), or a resolver can be employed.

The TAS 74 is provided at a portion on the steering shaft 12 between the speed reducer 72 and the steering wheel 11. The TAS 74 has the same configuration as the TAS 25 in the first embodiment shown in FIG. 1. The TAS 74 is constituted by a combination of an absolute angle sensor 74a and a torque sensor 74b. The absolute angle sensor 74a detects a rotation angle $\theta_{ss}$ of the steering shaft 12, as an absolute angle in a range exceeding 360°. Since the steering wheel 11 is coupled to the steering shaft 12, the rotation angle $\theta_{ss}$ of the steering shaft 12 is a value equal to the steering angle $\theta_s$ that is the rotation angle of the steering wheel 11. The torque sensor 74b detects a torque that is applied to the steering shaft 12 by the rotation operation of the steering wheel 11, as the steering torque $T_h$.

The reaction force control unit 75 executes a reaction force control to generate the steering reaction force corresponding to the steering torque $T_h$, through a drive control of the reaction motor 71. The reaction force control unit 75 computes a target steering reaction force, based on the steering torque $T_h$ that is detected through the torque sensor 74b of the TAS 74 and the vehicle speed V that is detected through a vehicle speed sensor 27, and computes a target steering angle of the steering wheel 11, based on the computed target steering reaction force, the steering torque $T_h$ and the vehicle speed V. Further, the reaction force control unit 75 computes the actual steering angle $\theta_s$ of the steering wheel 11, based on the rotation angle $\theta_a$ of the reaction motor 71 that is detected through the relative angle sensor 73. Then, the reaction force control unit 75 evaluates the deviation between the target steering angle and the actual steering angle $\theta_s$ and controls electricity supply for the reaction motor 71 such that the deviation is eliminated.

The reaction force control unit 75 executes a connection-disconnection control to switch the clutch 61 between the connection state and the disconnection state, based on whether a clutch connection condition is satisfied. As the clutch connection condition, for example, there are three conditions (a), (b) and (c) described below.

(a) The electric power source switch of the vehicle is in the off-state.

(b) An abnormality of a constituent element for generating the steering reaction force, for example, an abnormality of the reaction motor 71, has been detected.

(c) An abnormality of a constituent element for generating a turning force, for example, an abnormality of a turning motor 81 described later, has been detected.

When the clutch connection condition is satisfied, the reaction force control unit 75 generates a command signal for connecting the clutch 61. On the other hand, when the clutch connection condition is not satisfied, the reaction force control unit 75 generates a command signal for disconnecting the clutch. The clutch control unit 62 controls the connection and disconnection of the clutch 61, based on the command signals that are generated by the reaction force control unit 75.

The steering apparatus 100 includes the turning motor 81, a speed reducer 82, a pinion shaft 83, a relative angle sensor 84, a TAS 85 and a turning control unit 86, as a configuration for generating the turning force that is a dynamic force for turning the turning wheels 16.

The turning motor 81 is a generation source of the turning force. As the turning motor 81, for example, a brushless motor having three phases is employed. The turning motor 81 is coupled to the pinion shaft 83 through the speed reducer 82. A pinion gear 83a of the pinion shaft 83 engages with a rack gear 14b of a turning shaft 14. The torque of the turning motor 81 is given to the turning shaft 14 through the pinion shaft 83, as the turning force. With the rotation of the turning motor 81, the turning shaft 14 moves along a vehicle width direction (a right-left direction in the figure).

The relative angle sensor 84 is provided on the turning motor 81. The relative angle sensor 84 detects a rotation angle $\theta_b$ of the turning motor 81, as a relative angle in a range from 0° to 360°. As the relative angle sensor 84, for example, various types of sensors including a magnetic sensor such as a Hall sensor or a magnetoresistance effect sensor (MR sensor), or a resolver can be employed.

The TAS 85 is provided on the pinion shaft 13. The TAS 85 has the same configuration as the TAS 25 in the first embodiment shown in FIG. 1. The TAS 85 is constituted by a combination of an absolute angle sensor 85a and a torque sensor 85b. The absolute angle sensor 85a detects a rotation angle $\theta_{pa}$ of the pinion shaft 13, as an absolute angle in a range exceeding 360°. The torque sensor 85b detects a torque $T_p$ that acts on the pinion shaft 13.

The turning control unit 86 executes a turning control to turn the turning wheels 16 depending on a steering state, through a drive control of the turning motor 81. The turning control unit 86 detects the rotation angle $\theta_b$ of the turning motor 81 that is detected through the relative angle sensor 84, and controls the turning motor 81, using the detected rotation angle $\theta_b$. The turning control unit 86 computes an actual rotation angle $\theta_{pb}$ of the pinion shaft 83, based on the rotation angle $\theta_b$ of the turning motor 81 that is detected through the relative angle sensor 84. Further, the turning control unit 86 computes a target pinion angle, using the target steering angle that is computed by the reaction force control unit 75. Then, the turning control unit 86 evaluates the deviation between the target pinion angle and the actual rotation angle $\theta_{pb}$ of the pinion shaft 83, and controls electricity supply for the turning motor 81 such that the deviation is eliminated.

The turning control unit 86 also executes the connection-disconnection control to switch the clutch 61 between the connection state and the disconnection state, based on whether any of the above clutch connection conditions (a) to (c) is satisfied. When the clutch connection condition is satisfied, the turning control unit 86 generates a command signal for connecting the clutch 61. On the other hand, when the clutch connection condition is not satisfied, the turning control unit 86 generates a command signal for disconnecting the clutch. The command signals are command signals for the clutch control unit 62.

Next, the reaction force control unit 75 will be described in detail. Basically, the reaction force control unit 75 has the same configuration as the control device 26 in the first embodiment shown in FIG. 2. As shown by reference characters in parentheses in FIG. 2, the reaction force control unit 75 includes a computation circuit 75a, a microcomputer 75b and a drive circuit 75c.

Basically, the computation circuit 75a has the same configuration as the computation circuit 31 in the first embodiment shown in FIG. 4. While the above computation circuit 31 takes in the rotation angle $\theta_m$ of the assist motor 21 and the rotation angle $\theta_{pa}$ of the pinion shaft 13, the computation circuit 75a takes in the rotation angle $\theta_a$ of the reaction motor 71 that is detected through the relative angle sensor 73 and the rotation angle $\theta_{ss}$ of the steering shaft 12 that is detected through the absolute angle sensor 74a of the TAS 74. The computation circuit 75a computes the steering angle $\theta_s$ in the range exceeding 360°, as the absolute angle, using the taken rotation angles $\theta_a$, $\theta_{ss}$.

In the same processing procedure as that in the flowchart of FIG. 9, the computation circuit 75a computes a correction value $N_c$ for the rotation number of the reaction motor 71 that is computed based on the rotation angle $\theta_{ss}$ of the steering shaft 12. However, in the embodiment, in each process of the flowchart of FIG. 9, the rotation angle $\theta_{pa}$ of the pinion shaft 13 is replaced with the rotation angle $\theta_{ss}$ of the steering shaft 12. Further, the rotation angle $\theta_m$ of the assist motor 21 is replaced with the rotation angle $\theta_a$ of the reaction motor 71.

The microcomputer 75b computes the target steering reaction force, based on the steering torque $T_h$ that is detected through the torque sensor 74b of the TAS 74 and the vehicle speed V that is detected through the vehicle speed sensor 27, and computes the target steering angle of the steering wheel 11, based on the target steering reaction force, the steering torque $T_h$ and the vehicle speed V. The microcomputer 75b evaluates the deviation between the target steering angle and the steering angle $\theta_s$ (absolute angle) that is computed by the computation circuit 75a, and controls electricity supply for the reaction motor 71 through the drive circuit 75c, such that the deviation is eliminated.

Next, the turning control unit 86 will be described in detail. Basically, the turning control unit 86 has the same configuration as the control device 26 in the first embodiment shown in FIG. 2. As shown by reference characters in parentheses in FIG. 2, the turning control unit 86 includes a computation circuit 86a, a microcomputer 86b and a drive circuit 86c.

Basically, the computation circuit 86a has the same configuration as the computation circuit 31 in the first embodiment shown in FIG. 4. While the above computation circuit 31 takes in the rotation angle $\theta_m$ of the assist motor 21 and the rotation angle $\theta_{pa}$ of the pinion shaft 13, the computation circuit 86a takes in the rotation angle $\theta_b$ of the turning motor 81 that is detected through the relative angle sensor 84 and the rotation angle $\theta_{pa}$ of the pinion shaft 13 that is detected through the absolute angle sensor 85a of the TAS 85. The computation circuit 86a computes the rotation angle $\theta_{pb}$ of the pinion shaft 83 in the range exceeding 360°, as the absolute angle, using the taken rotation angles $\theta_b$, $\theta_{pa}$.

Incidentally, in the case where factors (tooth pitch, pressure angle and the like) of the rack gears 14a, 14b of the turning shaft 14 are set to identical values, the rotation angle $\theta_{pa}$ of the pinion shaft 13 and the rotation angle $\theta_{pb}$ of the pinion shaft 83 are the same as each other.

In the same processing procedure as that in the flowchart of FIG. 9, the computation circuit 86a computes a correction value $N_c$ for the rotation number of the turning motor 81 that is obtained by transforming the rotation angle $\theta_{pa}$ of the pinion shaft 13. However, in the embodiment, in each process of the flowchart of FIG. 9, the rotation angle $\theta_m$ of the assist motor 21 is replaced with the rotation angle $\theta_b$ of the turning motor 81. The computation circuit 86a computes the rotation angle $\theta_{pb}$ of the pinion shaft 83 as the absolute angle, based on the more accurate rotation number on the basis of the motor neutral point of the turning motor 81 and the rotation angle $\theta_b$ of the turning motor 81.

The microcomputer 86b takes in the target steering angle of the steering wheel 11 that is computed by the reaction force control unit 75, as a target rotation angle of the pinion shaft 83. The microcomputer 75b evaluates the deviation between the target rotation angle of the pinion shaft 83 and the rotation angle $\theta_{pb}$ (absolute angle) of the pinion shaft 83 that is computed by the computation circuit 86a, and controls electricity supply for the turning motor 81 through the drive circuit 86c, such that the deviation is eliminated.

For example, at the time of detection of the abnormality of the constituent element (the reaction motor 71, the relative angle sensor 73 or the reaction force control unit 75) for generating the steering reaction force, the microcomputer 86b connects the clutch 61. Then, the microcomputer 86b computes the target assist force, based on the torque $T_p$ that is detected through the TAS 85, and controls electricity supply for the turning motor 81 such that the target assist force is generated. The torque of the turning motor 81 is given to the turning shaft 14 through the speed reducer 82, and thereby the operation of the steering wheel 11 is assisted. That is, the steering apparatus 100 functions as an electric power steering apparatus (EPS).

Accordingly, with the second embodiment, it is possible to obtain the same effects as the effects in the first embodiment, as described below. The rotation number that is on the basis of the motor neutral point of the reaction motor 71 and that is obtained by converting the rotation angle $\theta_{ss}$ of the steering shaft 12 that is detected through the absolute angle sensor 74a of the TAS 74 is corrected using the rotation number of the reaction motor 71 that is detected through the relative angle sensor 73. It is possible to secure the computation accuracy of the steering angle $\theta_s$, by using the more accurate rotation number on the basis of the motor neutral point of the reaction motor 71 based on the rotation angle $\theta_{ss}$ of the steering shaft 12.

In the period during which the electric power source switch of the vehicle is in the off-state, there is a fear that the steering wheel 11 rotates by an external force given to the steering wheel 11. In this respect, when the electric power source switch of the vehicle is switched from the off-state to the on-state, the absolute angle sensor 74a of the TAS 74 immediately detects the rotation angle $\theta_{ss}$ of the steering shaft 12 as the absolute angle. Therefore, when the electric power source switch of the vehicle is switched from the off-state to the on-state, the computation circuit 75a can immediately convert the rotation angle $\theta_{ss}$ of the steering shaft 12, into the rotation number on the basis of the motor neutral point of the reaction motor 71. Accordingly, the computation circuit 75a does not need to monitor the rotation number of the reaction motor 71 in the period during which the electric power source switch of the vehicle is in the off-state. Therefore, it is possible to restrain electric power consumption in the period during which the electric power source switch of the vehicle is in the off-state.

The rotation number that is on the basis of the motor neutral point of the turning motor 81 and that is obtained by converting the rotation angle $\theta_{pa}$ of the pinion shaft 13 that is detected through the absolute angle sensor 85a of the TAS 85 is corrected using the rotation number of the turning motor 81 that is detected through the relative angle sensor 84. It is possible to secure the computation accuracy of the rotation angle $\theta_{pa}$ of the pinion shaft 13 and furthermore the rotation angle $\theta_{pb}$ of the pinion shaft 83, by using the more accurate rotation number on the basis of the motor neutral point of the turning motor 81 based on the rotation angle $\theta_{pa}$ of the pinion shaft 13.

When the electric power source switch of the vehicle is turned off, the clutch 61 is connected. Therefore, in the period during which the electric power source switch of the vehicle is in the off-state, when an external force is given to the steering wheel 11, there is a fear that the turning wheels 16 are turned with the rotation of the steering wheel 11. In this respect, when the electric power source switch of the vehicle is switched from the off-state to the on-state, the absolute angle sensor 85a of the TAS 85 immediately detects the rotation angle $\theta_{pa}$ of the pinion shaft 13 as the absolute value. Therefore, when the electric power source switch of the vehicle is switched from the off-state to the on-state, the computation circuit 86a can immediately convert the rotation angle $\theta_{pa}$ of the pinion shaft 13, into the rotation number on the basis of the motor neutral point of the turning motor 81. Accordingly, the computation circuit 86a does not need to monitor the rotation number of the turning motor 81 in the period during which the electric power source switch of the vehicle is in the off-state. Therefore, it is possible to restrain electric power consumption in the period during which the electric power source switch of the vehicle is in the off-state.

Other Embodiments

The first and second embodiments may be carried out while being modified as follows. In the first embodiment, the EPS equipped with the control device 26 may be a type of EPS that gives the assist force to the steering shaft 12.

In the second embodiment, the clutch control unit 62, the reaction force control unit 75 and the turning control unit 86 may be configured as a single control device. In the second embodiment, a configuration excluding the clutch 61 and the clutch control unit 62 may be employed as the steering apparatus 100. In this case, the state where the dynamic force transmission between the steering wheel 11 and the turning wheels 16 is separated is constantly maintained.

In the second embodiment, a configuration excluding the correction processing unit 50 may be employed as at least one of the computation circuit 75a of the reaction force control unit 75 and the computation circuit 86a of the turning control unit 86.

In the first and second embodiments, the steering apparatuses 10, 100 are provided with the TASs 25, 74, 85 in which the absolute angle sensors 25a, 74a, 85a and the torque sensors 25b, 74b, 85b are combined. However, the absolute angle sensors 25a, 74a, 85a and the torque sensors 25b, 74b, 85b may be independently provided as separate sensors. In this case, in the second embodiment, it is not necessary to provide the torque sensor 85b on the pinion shaft 13.

In the first and second embodiments, the computation circuits 31, 75a, 86a may be incorporated in the microcomputers 33, 75b, 86b, as function parts of the microcomputers 33, 75b, 86b.

In the first and second embodiments, as the transmission mechanism that transmits the dynamic force generated by the assist motor 21 and the turning motor 81 to the turning shaft 14, a belt transmission mechanism or a ball screw mechanism may be employed, instead of the speed reducers 22, 82 and the pinion shafts 23, 83.

In the first and second embodiments, the control device 26, the reaction force control unit 75 or the turning control unit 86 may be embodied as a control device for another mechanical apparatus that uses a motor as a dynamic force source, without being limited to the steering apparatus 10, 100. In this case, the mechanical apparatus needs to include a relative angle sensor to detect the relative rotation angle of a first rotation body that interlocks with a rotation detection object of the mechanical apparatus, and an absolute angle sensor to detect the absolute rotation angle of a second rotation body that interlocks with the rotation detection object.

What is claimed is:

1. A motor control device configured to control a motor depending on a position of a rotation detection object, the motor being a dynamic force source, the rotation detection object rotating while interlocking with the motor, the motor and the rotation detection object being included in a mechanical apparatus, the mechanical apparatus including a plurality of constituent elements that interlock with each other, the motor control device comprising:

a computation circuit configured to compute an absolute rotation angle of the rotation detection object, using a relative rotation angle of a first constituent element of the mechanical apparatus and a rotation number conversion value, the relative rotation angle of the first constituent element being detected through a relative angle sensor that is provided in the mechanical apparatus, the rotation number conversion value being a value resulting from converting an absolute rotation angle of a second constituent element of the mechanical apparatus into a rotation number of the first constituent element, the absolute rotation angle of the second constituent element being detected through an absolute angle sensor that is provided in the mechanical apparatus, wherein the computation circuit includes a correction processing unit configured to correct the rotation number conversion value, based on comparison between the relative rotation angle of the first constituent element and a rotation angle conversion value, on a premise that a difference between the relative rotation angle of the first constituent element and the rotation angle conversion value is within a rotation angle equivalent to half rotation of the first constituent element and that the relative rotation angle of the first constituent element is correct, the rotation angle conversion value being a value resulting from converting a rotation angle correspondence value into the relative rotation angle of the first constituent element, the rotation angle correspondence value corresponding to the relative rotation angle of the first constituent element that is obtained when the rotation number conversion value is evaluated.

2. The motor control device according to claim 1, wherein:

the computation circuit includes a first conversion unit configured to compute a first rotation angle conversion value resulting from converting the absolute rotation angle of the second constituent element into the relative rotation angle of the first constituent element based on a reduction ratio between the first constituent element and the second constituent element, and a second conversion unit configured to compute the rotation number conversion value by dividing the first rotation angle conversion value by 360°, 360° being a rotation angle equivalent to one rotation of the first constituent element; and the correction processing unit includes a first processing unit configured to separate the rotation number conversion value into an integer part and a decimal part as the rotation angle correspondence value, the integer part corresponding to the rotation number of the first constituent element, the decimal part corresponding to the relative rotation angle of the first constituent element, a second processing unit configured to compute a correction value for the integer part, based on comparison between the relative rotation angle of the first constituent element and a second rotation angle conversion value, in view of the premise, the second rotation angle conversion value being a value resulting from transforming the decimal part into the relative rotation angle of the first constituent element, and a third processing unit configured to compute a final rotation number of the first constituent element by adding a value of the integer part and the correction value, the final rotation number of the first constituent element being used for the computation of the absolute rotation angle of the rotation detection object.

3. The motor control device according to claim 1, wherein the computation circuit includes a rotation number computation unit configured to compute the rotation number of the first constituent element based on the relative rotation angle of the first constituent element that is detected through the relative angle sensor, a subtractor configured to compute a correction value for the rotation number of the first constituent element that is computed by the rotation number computation unit, by subtracting the rotation number of the first constituent element that is computed by the rotation number computation unit, from a final rotation number that is computed by the correction processing unit, and an absolute angle computation unit configured to compute the absolute rotation angle of the rotation detection object, based on the relative rotation angle of the first constituent element that is detected through the relative angle sensor and a final rotation number of the first constituent element after the correction value is reflected in the rotation number of the first constituent element that is computed by the rotation number computation unit.

4. The motor control device according to claim 1, wherein:

the first constituent element is an assist motor configured to generate a steering assistance force, the steering assistance force being a torque that is given to a steering mechanism of a vehicle and that is in the same direction as a steering direction;

the second constituent element is a pinion shaft that engages with a turning shaft, the turning shaft being a shaft by which a turning wheel of the vehicle is turned; and the rotation detection object is a steering shaft that is coupled to the turning shaft through the pinion shaft.

5. The motor control device according to claim 1, wherein:

the first constituent element is a reaction motor configured to generate a steering reaction force, the steering reaction force being a torque that is given to a steering shaft and that is in an opposite direction of a steering direction, dynamic force transmission between the steering shaft and a turning shaft being separated, the turning shaft being a shaft by which a turning wheel of a vehicle is turned;

the second constituent element is a pinion shaft that engages with the turning shaft; and the rotation detection object is the steering shaft.

6. The motor control device according to claim 1, wherein:

the first constituent element is a turning motor configured to generate a turning force that is given to a turning shaft and by which a turning wheel of a vehicle is turned, the turning shaft being a shaft by which the turning wheel of the vehicle is turned;

the second constituent element is a first pinion shaft that engages with the turning shaft; and the rotation detection object is a second pinion shaft that engages with the turning shaft.

* * * * *